Jan. 26, 1960   P. T. HAAKE   2,922,668
ROTARY MECHANICAL SEAL
Filed April 12, 1954   2 Sheets-Sheet 1

INVENTOR.
PAUL T. HAAKE
BY
Edward R. Lowndes

Jan. 26, 1960   P. T. HAAKE   2,922,668
ROTARY MECHANICAL SEAL
Filed April 12, 1954   2 Sheets-Sheet 2

INVENTOR:
PAUL T. HAAKE
BY
Edward R. Lowndes

United States Patent Office 2,922,668
Patented Jan. 26, 1960

2,922,668
ROTARY MECHANICAL SEAL

Paul T. Haake, Park Ridge, Ill., assignor to Crane Packing Company, Chicago, Ill., a corporation of Illinois Application April 12, 1954, Serial No. 422,532

4 Claims. (Cl. 286—11.15)

The present invention relates to improvements in fluid seals and more particularly it relates to a rotary mechanical seal for relatively rotatable members, as for example, a shaft and a housing therefor. Still more specifically the invention is concerned with an end face seal in which a running seal is effected by the face-to-face contact between substantially flat surfaces provided on two members which are formed of relatively hard materials.

The improved rotary mechanical seal comprising the present invention is of the general type shown and described in the copending application of Frank E. Payne, Serial No. 307,455, filed September 2, 1952, now Patent No. 2,872,220, the present seal being designed for use in certain applications wherein it is possessed of superior operating advantages. For example, in connection with certain types of pumps and with certain installations thereof it is necessary to install a seal at the outside of the pump inasmuch as the design of the pump is such that there is no room for installation of a seal within the pump housing. Such outside seals are of course subject to internal pump pressures and they are designed to prevent fluid from escaping from the pump housing around the pump shaft and through the opening into which the shaft extends. In the above mentioned application the seal disclosed therein employs a cone-shaped sealing ring designed for interpositioning between two parts which are to be sealed relative to each other, together with yielding pressure applying means for causing the sealing ring to bear against each of the two parts by a wedging action wherein the sealing ring is firmly pressed into engagement with each of the two parts. Such a seal is extremely effective for sealing a liquid against passage between the two parts in one direction only but the use of the seal as an outside seal where internal pressures must be held is precluded inasmuch as internal pressure acting upon the sealing member may develop to a point where the member is literally blown away from one of the members against which it bears against the action of the yieldable pressure applying means. In this respect the present seal is designed as an improvement over the seal shown in the Payne application in that it is capable of sealing the escape of fluid between the two members in either direction and toward this end it contemplates the provision of a seal of this type employing a sealing ring or a sealing ring assembly in which hydraulic loads operating in either direction will tend to tighten the seal or improve the sealing action effected by the seal assembly. Because of the fact that the present seal is effective against hydraulic loads operating in either direction it is capable of use alternatively either as an internal or as an external seal in various types of installations. The provision of a seal possessing the characteristics briefly outlined above being among the principal objects of the present invention, another and important object thereof is to provide a seal having a novel form of sealing ring which performs its sealing function by a wedging action in the seal assembly and in which, additionally, effective centering means is provided for directing the mechanical pressure applying means against the sealing rings at the most effective region on the latter so that the sealing rings will perform their sealing function in an efficient manner. A similar and related object of the invention is to provide a seal assembly of this type wherein the pressure applying means for the sealing rings is self-centering so that there will be no tendency for the sealing ring to exert a greater pressure against one of the sealed members with which it is associated than against the other. Stated otherwise, it is an object of the invention to provide a sealing ring whose sealing effect is uniform throughout its entire sealing area.

Still another object of the invention, in a seal of this character, is to provide a sealing ring and pressure applying means therefor which require no special adaptors for effecting centering of the pressure applying means on the sealing ring or sealing ring assembly.

Another object of the invention is to provide a sealing ring or sealing ring assembly in which the individual parts thereof are formed of a material which is semi-pliable so that when pressure is applied thereto the material will flow into sealing relationship with the two parts which are intended to be sealed so that equal pressure will be applied against both parts while at the same time sufficient resistance to deformation of the parts is afforded so that a strong wedging action between the two parts may effectively be maintained.

Finally, in a modified form of the invention, it is an object thereof to provide a sealing assembly of this character in which a small amount of lubricant may be initially associated and which lubricant will remain in the seal to effectively lubricate the moving parts thereof throughout the entire life of the seal.

With these and other objects in view, which will become more readily apparent as the nature of the invention is better understood, the same consists in the novel construction, combination, and arrangement of parts shown in the accompanying two sheets of drawings forming a part of this specification.

In these drawings.

In all of the above described views, similar characters of reference are employed to designate similar parts throughout.

Figure 1:
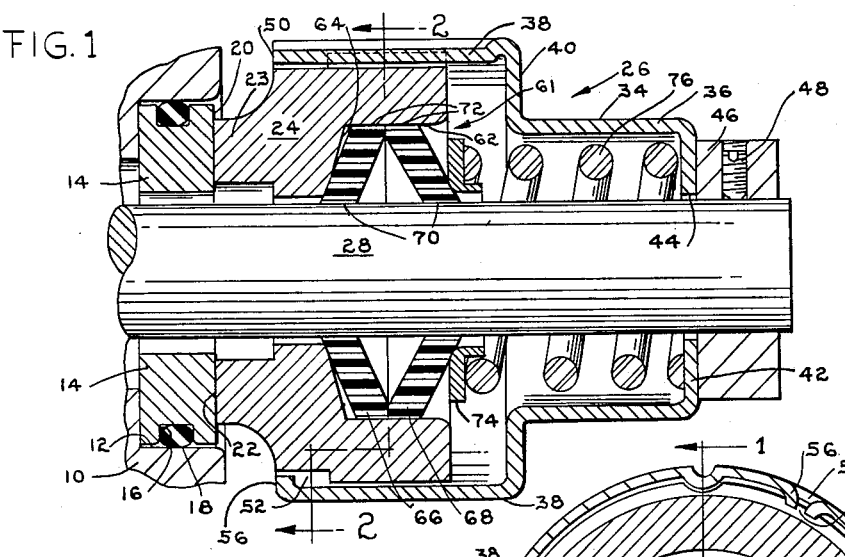
Fig. 1 is a fragmentary longitudinal sectional view taken substantially centrally through a pump construction showing one form of the improved bearing seal applied thereto. This view is taken substantially along the line 1—1 of Fig. 2.
Figure 2:
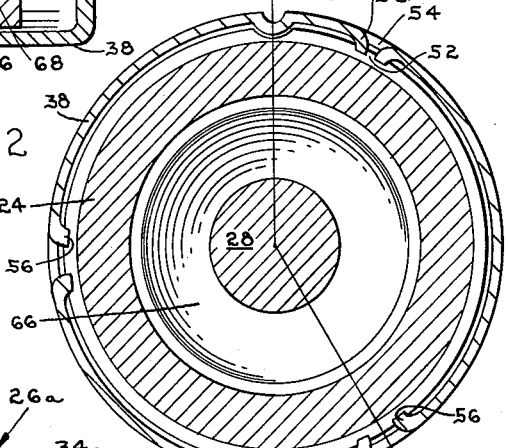
Fig. 2 is a sectional view taken substantially along the line 2—2 of Fig. 1.

Referring now to the drawings in detail and in particular to Figs. 1 and 2, the improved seal of the present invention has, purely for illustrative purposes, been shown as being operatively associated with a pump construction including a casing 10 having a shaft opening 12 therein into which there has been pressed or otherwise secured a seal seat 14 in the form of a ring having a peripheral groove 16 in which there is disposed a sealing element 18 which may be a conventional O-ring. The outside face 20 of the seat member 14 is preferably lapped flat to provide a seal surface designed for running engagement with a similar flat surface 22 provided on the reduced nose portion 23 of a sealing washer 24 associated with the seal assembly 26 of the present invention. The usual pump shaft 28 projects outwardly through the opening 12 in the casing and passes through the seat number 14 and extends centrally through the sealing assembly 26.

The seal assembly 26 in the form of the invention illustrated in Figs. 1 and 2 is thus employed as an outside seal to seal the fluid contained within the pump casing 10 against egress outwardly around the shaft 28 through the opening 12. This seal assembly involves in its general organization the previously mentioned sealing washer 24 which is slidably disposed within an outer retainer in the form of a cup-shaped shell 34 having a reduced cylindrical portion 36, an enlarged cylindrical portion 38 of larger diameter, an interconnecting radial wall 40 and an end face or wall 42 provided with a central opening 44 therein through which the shaft 28 projects. A thrust collar 46 is affixed to the shaft 28 by means of one or more set screws 48 and is adapted to bear against the wall 42 to limit the outward movement of the seal assembly 26 as a whole in a direction away from the casing wall 10. The end of the retainer 34 remote from the wall 42 is open and a portion of the washer 24 projects outwardly beyond the open rim 50 of the retainer. The washer 24 is formed with a series of three peripheral slots 52 therein arranged 120° apart and portions of the rim 50 of the retainer are slotted as at 54 to provide respective pairs of spring fingers 56 which are staked inwardly as shown in Fig. 2 so as to extend into the grooves 52 and slidably retain the washer 24 against dislodgement from the retainer shell when the seal assembly is in stock or otherwise not in use. The washer 24 is also formed with a pair of diametrically opposed longitudinally extending grooves 58 and a cylindrical portion 38 of the retainer is formed with a pair of longitudinal inwardly extending ribs 60 which project into the grooves 58 to provide an interlocking arrangement of parts in which constitutes a driving means whereby the washer 24 may be driven from the shaft 28 through the thrust collar 46 and retainer 34. The washer 24 is provided with a circular recess 61 in its rear face providing a central cylindrical bore 62 the bottom 64 of which is generally of concave cone shape.

In order to seal the washer 24 to the shaft 28 and prevent passage of fluid from the interior of the pump casing 10 through the opening 12 and washer 24 to the atmosphere, a pair of sealing rings 66 and 68 in the form of cone frusta encircle the shaft and are nested within the cylindrical bore or recess 61. The frusto-conical members 66 and 68 are formed of a material which possesses a considerable degree of resistance to compressional forces without undergoing substantial deformation and each crusto-conical member is provided with a cylinrical inner periphery 70 designed for sealing engagement with the shaft and with an outer cylindrical periphery or rim 72 designed for sealing engagement with the cylindrical bore 62 provided in the sealing washer 24. The sealing members 66 and 68 are arranged in back-to-back or tandem relationship with the outer peripheral edges of the members in contacting relationship and with the inner peripheries of these members engaging the shaft 28 at spaced points. The slant angles of the frusto-conical members 66, 68 may vary within prescribed limits but in any instance the slant height of each cone frustum will be in excess of the radial distance between the surface of the shaft 28 and the inner surface or bore 62 of the recess 61. The slant angles of the members 66 and 68 are shown in Fig. 1 as being approximately 60° but it will be understood of course that other slant angles are contemplated, the particular angle selected being a function of the desired pressures at the inner and outer peripheral edges of the members when lateral inward thrust is applied to the members near the base thereof to cause them to perform a wedging action against the shaft 28 and bore 62.

The slant angle of the frusto-conical member 66 is slightly more obtuse than the slant angle of the conical surface 64 of the recess bottom for a purpose that will be made clear presently. A thrust member in the form of a flat washer 74 surrounds the shaft 28 and has its inner periphery slightly spaced from the shaft. The forward inner edge of the washer may be slightly rounded and is adapted to bear against the outermost frusto-conical member 68. A coil spring 76 surrounds the shaft 28 and bears at one end against the washer 74 and at the other end against the end wall 42 of the retainer 34. The spring 76 thus serves to normally urge the thrust washer 74 toward the left as viewed in Fig. 1 so that the rounded rim portion thereof exerts a pressure on the outermost frusto-conical member 68 at a region near the small base of the cone frustum. The frusto-conical member 68 is thus normally urged in the direction of the sealing washer and, because the outer rim of the member 68 bears against the outer rim of the member 66, a wedging action is set up in both of these members whereby their inner peripheries are forced against the outer cylindrical surface of the shaft 28 in sealing relationship with respect thereto. This welging action obtains by virtue of the tendency of the two frusto-conical members to straighten out in radial fashion and due to the prevention of such radial straightening out by the spaced limitations provided for these members. By such an arrangement a strong wedging action, the effect of which is a function of the slant height of the cone frusta relative to the radial distance between the shaft 28 and bore 62, is attained.

It has previously been stated that the material from which the frusto-conical members 66 and 68 are constructed is relatively incompressible. The term "incompressible" as employed herein refers to the inability of the material to decrease in overall volume when subjected to a compressional force. In other words, the material lacks compressibility in the sense that a sponge possesses it. One material which fulfills the requirements of the present seal is a polytetrafluoroethylene polymer which is manufactured and sold by E. I. du Pont de Nemours & Co., under the trade-name "Teflon." This material is characterized by its chemical inertness ranging from extremely low temperatures up to 572° F. In this range the material resists the attack of corrosive reagents and solvents. Physically, molded "Teflon" is a tough white-to-gray solid. The material is practically incompressible but it is subject to deformation or cold flow with such deformation taking place in direct proportion to some power of the applied deforming force. Upon release of the compressive force the material tends to resume its original dimensions.

From the above description it will be seen that when the bearing seal is placed in operative position exteriorly of a pump casing such as the casing 10 of Fig. 1, the sealing surface 22 provided at the end of the reduced nose portion 23 of the sealing washer 24 will be positioned under spring pressure acting through the frusto-conical tandem-arranged members 66 and 68, against the radial face 20 of the housing 10. As the shaft 28 rotates, a positive drive will exist through the retainer shell 34 and interlocking grooves and ribs 58, 60. By virtue of the positive drive train thus established any rotary thrust upon the frusto-conical sealing members 66, 68 will be eliminated while at the same time the sliding interfitting connection between the ribs and grooves will permit limited longitudinal shifting movement of the washer 24 to take up for progressive wear of the nose piece 23. During operation of the seal, the thrust washer 74 is forced against the outermost frusto-conical member 68 to create the wedging action previously referred to in order to effect a seal at the inner and outer peripheral edges of this member. The longitudinal thrust imparted to the member 68 is transmitted through its outer rim to the rim of the member 66 and both of these members will be forced against the surface of the shaft 28 and the surface of the bore 62 with a degree of force sufficient to prevent seepage of the confined liquid around the members 66 and 68. The magnitude of the force required varies not only with operating conditions but also with the slant angle of the frusto-conical members.

It is axiomatic that if a certain degree of force between two surfaces such as a face on one of the members 66 or 68 and the surface of the shaft is required to effect a seal, the material of the members must exert an opposing force at least equal to that tending to compress it. The necessary degree of force applied to the material of each of the two members 66 and 68 may be attained by the use of a relatively light spring 76 inasmuch as the force of the spring is materially increased by a leverage action of the two sealing members 66 and 68 in the recess 61, particularly when the slant angles of these members approach the maximum permissible slant angles.

As previously mentioned, the slant angle of the inner face of the inner sealing ring 66 is slightly less than the slant angle of the bottom face 64 of the recess 61. Thus when the sealing assembly is in actual use in an installation, particularly where the seal assembly 26 is employed as an internal seal within a pump housing, the spring pressure bearing against the frusto-conical member 68 and any hydraulic pressure which may be built up within the retainer shell will press the innermost cone member 66 toward the surface 64 so that in an extreme case, where high pressures are involved, this surface 64 may act as a backing wall to prevent distortion or collapse of the frusto-conical member 66.

Where the seal assembly 26 is used as an outside seal as shown in Fig. 1, internal pressure developed within the pump housing 10 will be prevented from passing outwardly between the running seal surfaces 20 and 22 and they will act against a very limited circular inner peripheral region of the sealing member 66. The degree of force exerted by this internal pressure on the member 66 will be relatively small and its effect is to oppose the action of the spring 76. The degree of opposition to the spring 76 is of course partially dependent upon the amount of clearance existing between the central bore of the washer 24 and the outer surface of the shaft 28 and when this clearance is extremely small, the pressure tending to oppose the pressure of the spring 76 will be almost negligible so that the rate of the spring 76 may be very materially reduced as compared to conventional springs as employed in connection with end face seals.

Figure 3:
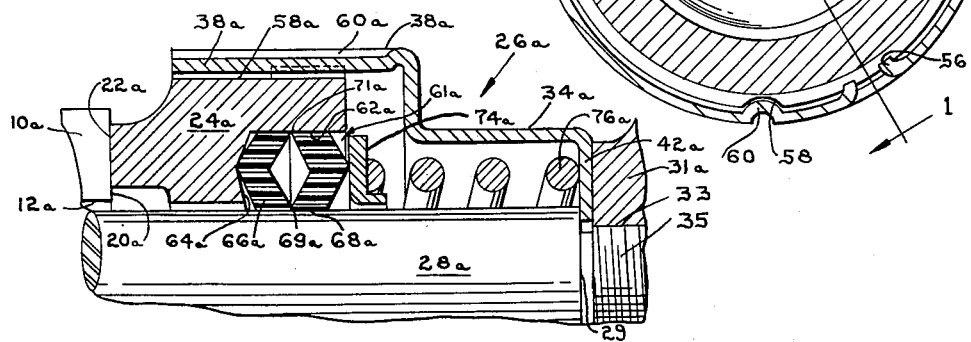
Fig. 3 is a fragmentary sectional view similar to Fig. 1 showing a similar seal assembly having a modified form of sealing ring associated therewith.

In Fig. 3 a somewhat modified form of seal assembly has been shown and the assembly is shown as being associated with a pump construction with the seal being employed as an internal seal. The construction is somewhat similar to that shown in Fig. 1 and, to avoid needless repetitious description, similar characteristics of reference bearing the suffix "a" have been employed to designate the corresponding parts between the two assemblies.

In the latter form of the invention the seal assembly 26a surrounds the shaft 28a and the end wall 42a of the retainer 34a is clamped between a shoulder 29 provided on the shaft 28a and one end of a pump impeller 31 threadedly received as at 33 on a reduced portion 35 of the shaft 28a. The sealing face 22a of the washer 24a is adapted to bear against an opposed surface 20a interiorly of the casing 10a and to surround the opening 12a through which the shaft 28a extends. The driving connection 58a, 60a between the cylindrical portion 38a of the retainer 34a and the washer 24a remains substantially the same as the driving connection shown in Fig. 1. In this modified form of the invention the opposed or tandem-arranged sealing elements or rings 66a and 68a which are disposed within the recess 61a of the washer 24a are in the form of elements which are V-shaped in cross section with their inner and outer peripheries contacting each other as indicated at 69a and 71a respectively. The thrust washer 74a which is backed by the spring 76a may be devoid of the rounded edge 70 of Fig. 1 and this washer bears centrally against the apex of the cone member 68a so that the wedging action effected upon the two members 66a and 68a exists by virtue of a tendency for these two members to "straighten out" so to speak and force their peripheral regions against the inner surface of the shaft 28a and the cylindrical wall of the bore 62a.

The sealing assembly just described and shown in Fig. 3 is serviceable either as an internal seal as shown or as an external seal in an installation of the type shown in Fig. 1. Depending upon whether one or the other sides of the two members 66a, 68a is the higher pressure side of the pump, there is a tendency for the fluid pressure to collapse one or the other of the two sealing members when extremely high pressures are obtained. Ordinarily very high pressures will be resisted by the rigidity of the members 66a and 68a but should one or the other of the two members collapse, the remaining member will serve as a wedge member to prevent escape of fluid. In the form of the invention just described the bottom wall 64a of the recess 61a instead of being conical as shown in Fig. 1, is of shallow troughlike design so that it will serve as a backing member for the innermost sealing member 66a.

Figure 4:
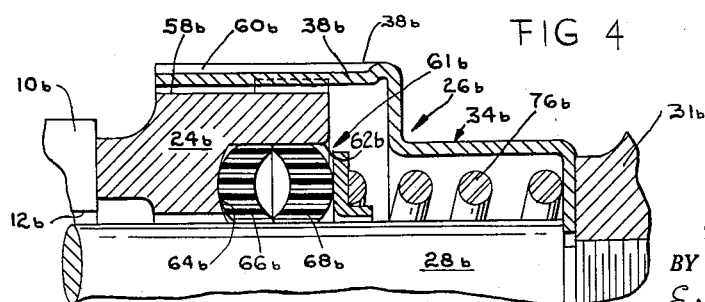
Fig. 4 is a sectional view similar to Fig. 3 in which the seal assembly utilizes another modified form of sealing ring.

In Fig. 4 a still further modified form of the invention has been shown. This form of the invention is in many respects similar to the form of the invention shown in Fig. 3 and in order to avoid needless repetition of description, similar characteristics of reference involving the suffix "b" have been applied to the corresponding parts.

In this form of the invention the sealing members 66b and 68b are generally crescent-like in cross section and are arranged in tandem or back-to-back relationship with their outer peripheries contacting each other on the inner sides of the members to thus create a generally oval toric void therebetween. The action of the sealing members 66b and 68b is generally similar to the action of the member 66a and 68a in the form of the invention shown in Fig. 3. In this form of the invention the bottom wall 64b of the washer 24b is of shallow arcuate trough-like configuration to form a suitable backing member for the member 66b.

Figure 5:
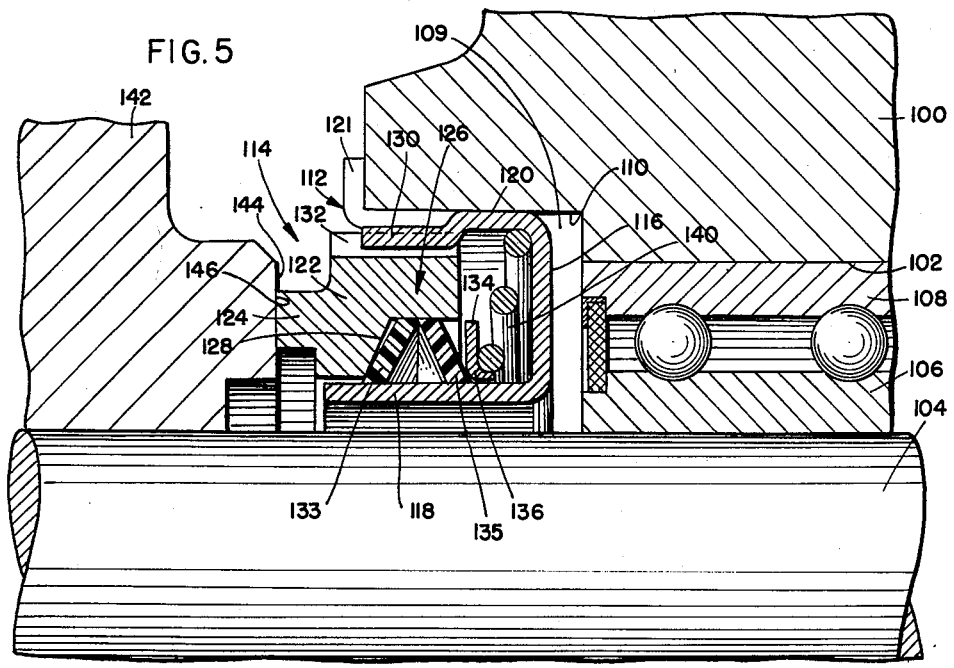
Fig. 5 is a longitudinal sectional view similar to Fig. 1 showing a compound package-type sealing unit embodying the principles of the present invention.

In Fig. 5 wherein a composite package-type seal utilizing the principles of the present invention has been illustrated, the sealing assembly has been shown operatively disposed in a pump installation including a casing 100 having an opening 102 therein through which an impeller shaft 104 extends and in which it is rotatably journaled by means of a ball bearing assembly including inner and outer races 106 and 108 respectively. The inner race 106 may turn with the shaft 104 while the outer race 108 is pressed into the casing 100. The inner face of the casing is provided with a recess 109 having an inner cylindrical wall 110. The recess 109 is adapted to receive therein by a pressed fit, the retainer or shell 112 of the package-type sealing assembly which has been designated in its entirety at 114.

The seal assembly 114 involves in its general organization the previously mentioned shell 112 which is of annular design and is cup-shaped in cross section so as to provide a radial rear wall 116, an inner cylindrical wall 118 which surrounds the shaft 104 and which is spaced therefrom a slight distance, and an outer generally cylindrical wall 120 having a radial locating flange 121. The assembly 114 further includes a sealing washer 122 which may be similar to the washer 24 of Fig. 1 and which has a forwardly extending nose piece 124 and a rearwardly facing circular recess 126 provided with a generally conical bottom face 128. The outer cylindrical wall 120 is provided with a pair of inwardly offset ribs 130 which extend into respective diametrically opposed grooves 132 provided in the periphery of the washer 122 for preventing rotation of the washer while permitting axial movement thereof relative to the retainer 112.

The washer 122 is adapted to be sealed to the cylindrical portion 118 of the shell 112 by means of a pair of frusto-conical sealing rings 133 and 135 which may be identical with the sealing rings 66 and 68 in the form of the invention shown in Fig. 1 and which may be similarly disposed within the recess 126 in back-to-back relationship. The material of the sealing rings 133 and 135, like the rings 66 and 68, is formed of a material which is relatively incompressible as for example "Teflon." A thrust washer 134 which is of L-shape configuration in cross section has a rounded edge 136 adapted to bear against the rear face of the sealing ring 135 at a region adjacent its inner peripheral edge. A conical compression spring 140 has its small end bearing against the thrust washer 134 and its large end bearing against the radial wall 116 of the retainer 112. The spring normally urges the thrust washer forwardly against the frusto-conical sealing member 135. In this manner the force applied to the ring 135 will effect the wedging action explained in connection with the sealing members 66 and 68 of Fig. 1, and which therefore need not be repetitiously described.

The shaft 104 carries an impeller hub 142 thereon having a rearwardly facing lapped surface 144 providing a seal seat and designed for running engagement with a similar surface 146 provided on the washer 122.

Although the seal assembly 114 described in detail above has been shown as being employed as an internal seal, the same may with but slight modification be employed as an external seal. As previously explained in connection with the other forms of the invention, the sealing members 133 and 135 may be subjected to hydraulic forces on either side thereof without any tendency for these members to collapse.

Figure 6:
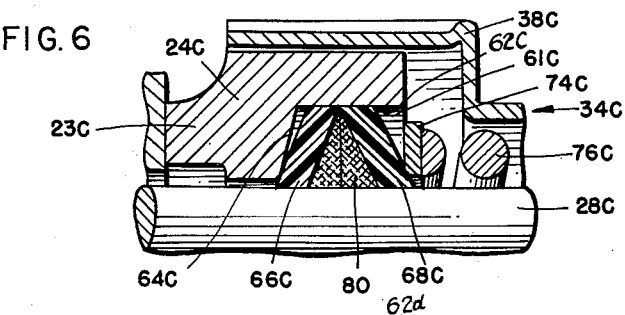
Fig. 6 is a sectional view similar to Fig. 3 showing a still further modified form of sealing unit.

In Fig. 6 a fragmentary portion of a further modified seal assembly has been shown. This assembly may be an external seal assembly of the general type shown in Fig. 1 or it may be an internal assembly of the type shown in Figs. 3 and 4. Additionally, it may represent a portion of the seal assembly shown in Fig. 5. In this form of the invention the frusto-conical sealing elements 66c and 68c are seated within a recess 61c provided in the washer 24c and a suitable heavy grease or other lubricant 80 may be contained within the toric void existing between the two frusto-conical members. This lubricant will facilitate limited sliding movement of the two sealing members on the shaft 28c. Such movement is extremely slight and since the shaft and washer are not capable of relative turning movement with respect to each other, the lubricant initially contained within this space will last throughout the life of the seal.

Figure 7:
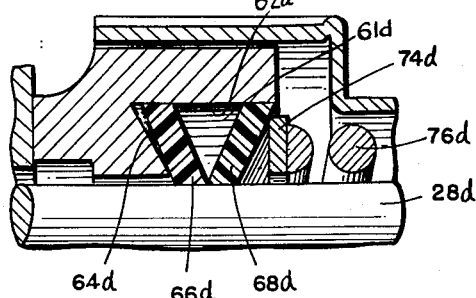
Fig. 7 is a sectional view similar to Fig. 3 illustrating another embodiment of the invention.

In Fig. 7 the seal construction shown is similar to that shown in Fig. 1, the principal difference being that the frusto-conical sealing members 66d and 68d have their inner peripheries in sliding engagement with the shaft 28d and their outer peripheries in engagement with the wall 62d of the recess 61d. This inverted arrangement of the thrust washer 74d and spring 76d is such that the washer 74d bears against the rearmost frusto-conical member 68d adjacent its large base to produce the desired wedging action.

The invention is not to be limited to the exact arrangement of parts shown in the accompanying drawings or described in this specification as various changes in the details of construction may be resorted to without departing from the spirit of the invention. Furthermore, additional modifications other than those illustrated herein are contemplated. For example, the sealing elements shown in Fig. 6 may be associated with a washer which in turn is incorporated in the type of seal shown in Fig. 5 rather than in connection with the type of seal shown in Fig. 1. Only insofar as the invention has been particularly pointed out in the accompanying claims is the same to be limited.

What I claim and desire to secure by Letters Patent is:

1. In a sealing device for sealing the space between two relatively rotatable elements, in combination, a sealing washer adapted to encircle one of the elements and having a radial sealing surface designed for running engagement with a radial surface normal to and fixed relative to the other element, there being an axial recess in said washer providing a cylindrical wall surrounding said one element and also providing a bottom wall, a pair of annular sealing rings formed of a resilient deformable material having a substantial degree of resistance to compressional forces encircling said one element and bearing inwardly thereagainst and outwardly against the cylindrical wall of the recess and forwardly against the bottom wall of the recess, said rings each being in the form of a cone frustum having a slant height greater than the radial distance between said one element and the cylindrical wall, the small base of each cone frustum being contiguous to said one element and the large base thereof being contiguous to the cylindrical wall of said recess, said sealing rings being arranged in back-to-back relationship with the large bases of said cone frusta bearing against each other and with the small bases thereof spaced from each other along the said one element, and thrust means yieldingly applying pressure to the sealing ring which is remote from said bottom wall of the recess in a direction to wedge the material of the latter sealing ring into sealing engagement with said one element and cylindrical wall and to force the large base of said remote sealing ring against the large base of the other sealing ring to in turn wedge said latter ring into sealing engagement with said one element, cylindrical wall and bottom of the recess.

2. In a sealing device for sealing the space between two relatively rotatable elements, in combination, a washer adapted to encircle one of the elements and having a radial sealing surface designed for running engagement with a radial surface normal to and fixed relative to the other element, there being an axial recess in said washer providing a cylindrical wall surrounding said one element and a bottom wall, a pair of annular sealing rings of frusto-conical configuration formed of a resilient deformable material having a substantial degree of resistance to compressional forces encircling said one element and bearing inwardly against the latter and outwardly against the cylindrical wall of the recess, said rings each having a circular outer periphery in engagement with the cylindrical wall of the recess and having a circular inner periphery in engagement with the outer surface of said one element, the slant height of each ring being greater than the radial distance between the cylindrical surface of said one element and the cylindrical wall of said recess, said rings being arranged in contiguous relationship within said recess with the outer peripheral rims thereof bearing against each other, the medial radial regions of said rings being offset in opposite directions from the transverse plane of contact between the rings to provide a toric void surrounding said one element and between said rings, and thrust means yieldingly applying pressure to the sealing ring which is remote from the bottom wall of said recess in a direction to wedge the material of the latter sealing ring into sealing engagement with said one element and cylindrical wall and to cause said latter sealing ring to bear against the other sealing ring and wedge the material of the latter into sealing engagement with said one element and cylindrical wall.

3. In a sealing device for relatively rotatable elements, the combination set forth in claim 1 wherein said bottom wall of the recess is of frusto-conical configuration and has a slant angle slightly less than the slant angle of said other sealing ring.

4. A self-contained sealing unit for effecting a fluid-tight seal between a shaft and a recessed casing comprising a cylindrical retainer housing including a generally cylindrical outer wall, a generally cylindrical inner wall and a radial wall connecting said cylindrical walls, said housing being receivable in the casing recess, an annular sealing washer surrounding said inner cylindrical wall and disposed between the latter and said outer cylindrical wall, said washer having a radial face designed for running engagement with a surface normal to and turning with the shaft, there being an axial recess formed in said washer providing a cylindrical side wall and a recess bottom wall, a pair of substantially incompressible sealing rings in the form of frusto-conical webs disposed within the recess, each of said webs having a slant height greater than the radial distance between the said inner cylindrical wall and the cylindrical side wall of said recess, said webs being arranged in back-to-back relationship with their outer peripheral rims in contact with each other along the inner cylindrical wall, and spring means disposed between the web which is remote from said recess bottom wall and the radial wall of said housing for wedging said latter web forwardly within the housing to wedge the same between said cylindrical inner wall of the housing and the cylindrical side walls of the recess to cause the same to bear against the outer peripheral regions of said other web to in turn cause said latter web to become wedged between said cylindrical inner wall of the housing and the bottom wall of the recess.

References Cited in the file of this patent

UNITED STATES PATENTS

| | | |
|---|---|---|
| 511,734 | Hoffstadt | Dec. 26, 1893 |
| 2,113,098 | Skinner | Apr. 5, 1938 |
| 2,199,761 | Shenton | May 7, 1940 |
| 2,445,410 | Smith | July 20, 1948 |
| 2,467,312 | Jack | Apr. 12, 1949 |
| 2,479,968 | Schick | Aug. 23, 1949 |

FOREIGN PATENTS

| | | |
|---|---|---|
| 124,487 | Australia | June 4, 1947 |